US012411444B2

(12) United States Patent
Oshima

(10) Patent No.: US 12,411,444 B2
(45) Date of Patent: Sep. 9, 2025

(54) IMAGE FORMING APPARATUS

(71) Applicant: CANON KABUSHIKI KAISHA, Tokyo (JP)

(72) Inventor: Yuki Oshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/636,762

(22) Filed: Apr. 16, 2024

(65) Prior Publication Data

US 2024/0345517 A1 Oct. 17, 2024

(30) Foreign Application Priority Data

Apr. 17, 2023 (JP) ................................ 2023-067004

(51) Int. Cl.
*G03G 15/00* (2006.01)
*G03G 15/20* (2006.01)
*G03G 21/00* (2006.01)

(52) U.S. Cl.
CPC ..... *G03G 15/2064* (2013.01); *G03G 15/5008* (2013.01); *G03G 21/0011* (2013.01); *G03G 2215/0021* (2013.01); *G03G 2215/00679* (2013.01)

(58) Field of Classification Search
USPC .......................................................... 399/38
See application file for complete search history.

(56) References Cited

U.S. PATENT DOCUMENTS

2002/0141774 A1* 10/2002 Nagano .............. G03G 15/2064 399/68
2004/0190924 A1* 9/2004 Iwasaki ................ G03G 15/657 399/68
2022/0100127 A1* 3/2022 Numata ............ G03G 15/2064

FOREIGN PATENT DOCUMENTS

JP 3-65978 A 3/1991

* cited by examiner

*Primary Examiner* — Quana Grainger
(74) *Attorney, Agent, or Firm* — Venable LLP

(57) ABSTRACT

An image forming apparatus includes a controller controlling conveyance of first and second recording materials. The controller calculates based on an acquired length of the second recording material in the conveyance direction before feeding, a loosening amount of the second recording material between a conveyance nip and a transfer nip when the second recording material is nipped therebetween. The controller determines based on the acquired information on the image, whether an image exists in a blurring region where an image defect is generated in the image to be transferred due to an impact that occurs when a trailing end of the second recording material with respect to the conveyance direction passes through the conveyance nip. The controller extends a conveyance interval between the first and second recording materials when it is determined that the loosening amount is a predetermined value or more and the image exists in the blurring region.

9 Claims, 9 Drawing Sheets

(a)

(b)

IMAGE FORMING APPARATUS

FIELD OF THE INVENTION AND RELATED ART

The present invention relates to an image forming apparatus using an electrophotographic method.

The image forming apparatus using the electrophotographic method nips and conveys a recording material with a conveyance nip portion formed by a conveyance roller and an opposing member, a transfer nip portion formed by an image bearing member and a transfer member, and a fixing nip portion formed by a rotatable fixing member and a rotatable pressing member. In addition, the image forming apparatus using the electrophotographic method includes a charging member, an exposure member, a developing member and a transfer member on an outer periphery of the image bearing member. Such an image forming apparatus performs latent imaging at a developing level by the exposing member in an exposing portion of the image bearing member charged by the charging member in a charging portion, and has a latent image portion of the image bearing member carry developer by the developing member in a developing portion. The carried developer is transferred to the recording material by the transfer member in the transfer nip portion. In this case, impact occurs at a trailing end in a conveyance direction of the recording material at a timing when the recording material exits the conveyance nip portion, the transfer nip portion and the fixing nip portion. The greater difference in a conveyance speed of the recording material in each nip portion is, the greater degree of tension or degree of loosening of the recording material, and the greater the occurring impact. In particular, if the impact occurs at the timing when the recording material exits the conveyance nip portion, the impact is also transmitted to the transfer nip portion via the recording material, and may cause fluctuation in a speed of the recording material or the image bearing member in the transfer nip portion. When such speed fluctuation occurs, if image formation is performed in the charging portion, the exposing portion, the developing portion and the transfer nip portion, there is a possibility that disturbance occurs in an image in that portion. For example, there is a possibility that elongation and contraction of the image in the portion occurs, and it is manifested as uneven density or elongation and contraction of texts. Hereinafter, image defect which occurs in this manner will be referred to as “blurring”.

In addition, the fixing device employed in the image forming apparatus using the electrophotographic method often employs a configuration in which one of a rotatable member of the rotatable heating member and the rotatable pressing member is rotationally driven and the other rotatable member is rotated followingly. And for the rotatable member, which is rotationally driven, material which expands in volume due to temperature rise is often used. In this fixing device, by temperature of the rotatable member, which is rotationally driven, dropping when fixing is performed to the recording material, which has a large heat capacity, such as a thick paper, there may be a case in which an outer diameter of the rotatable member becomes smaller and the conveyance speed of the recording material, which is followingly conveyed, in the fixing nip portion decreases. In such a case, the speed difference between the conveyance speed of the recording material in the fixing nip portion and the conveyance speed of the recording material in the conveyance nip portion becomes large, and due to the loosening occurring to the recording material, the blurring described above is likely to occur. Conventionally, to solve various problems caused by such a drop in the temperature of the rotatable member, it has been proposed to control a conveyance interval of the recording materials in response to the temperature of the rotatable member. In Japanese Patent Application Laid-Open No. H03-065978, it is disclosed that, by extending the conveyance interval of the recording materials in response to the temperature of the rotatable member, effect due to the temperature drop of the rotatable member which is rotationally driven is suppressed.

By the way, when fluctuation in a conveyance speed of the recording material occurs, if the image formation is performed in the charging portion, the exposing portion, the developing portion or the transfer nip portion, there is a possibility that, by the disturbance occurring in the image in that portion, the blurring is visually recognized. Conversely, the blurring will not be visually recognized if no image formation is performed in the charging portion, the exposing portion, the developing portion or the transfer nip portion when the speed fluctuation occurs.

SUMMARY OF THE INVENTION

The present invention aims to provide a means to suppress an occurrence of image defect while improving productivity, and has the following configuration.

An image forming apparatus comprises an image bearing member; a conveyance unit including a pair of rotatable members and configured to convey a recording material by a conveyance nip portion formed by the pair of rotatable members; a transfer unit forming a transfer nip portion with the image bearing member and configured to transfer a toner image onto the recording material, conveyed by the conveyance unit, in the transfer nip portion; a fixing unit including a rotatable heating member and a rotatable pressing member forming a fixing nip portion with the rotatable heating member and configured to fix the toner image transferred to the recording material by the transfer unit in the fixing nip portion; and a control unit configured to control conveyance of the recording material, wherein in a case of performing a continuous print in which a first recording material and a second recording material following the first recording material are conveyed and image formation is executed thereon, the control unit executes following operations of: acquiring information on an image to be formed on the second recording material and a length of the second recording material in a conveyance direction; calculating based on the acquired length of the second recording material in the conveyance direction before feeding the second recording material, a loosening amount which is an amount of loosening of the second recording material between the conveyance nip portion and the transfer nip portion in a case in which the second recording material is nipped in the conveyance nip portion and the transfer nip portion; determining based on the acquired information on the image, whether an image exists in a region where an image defect is generated in the image to be transferred to the second recording material due to an impact occurred when a trailing end of the second recording material in the conveyance direction passes through the conveyance nip portion; and performing extension control in which a conveyance interval between the first recording material and the second recording material is extended in a case in which it is determined that the loosening amount is a predetermined value or more and the image exists in the region.

According to the present invention, the occurrence of the image defect can be suppressed while improving productivity.

Further features of the present invention will become apparent from the following description of exemplary embodiments with reference to the attached drawings.

DESCRIPTION OF THE EMBODIMENTS

Hereinafter, preferred Embodiments for the present invention will be described using Figures.

Embodiment 1

(Image Forming Apparatus)

Figure 1:
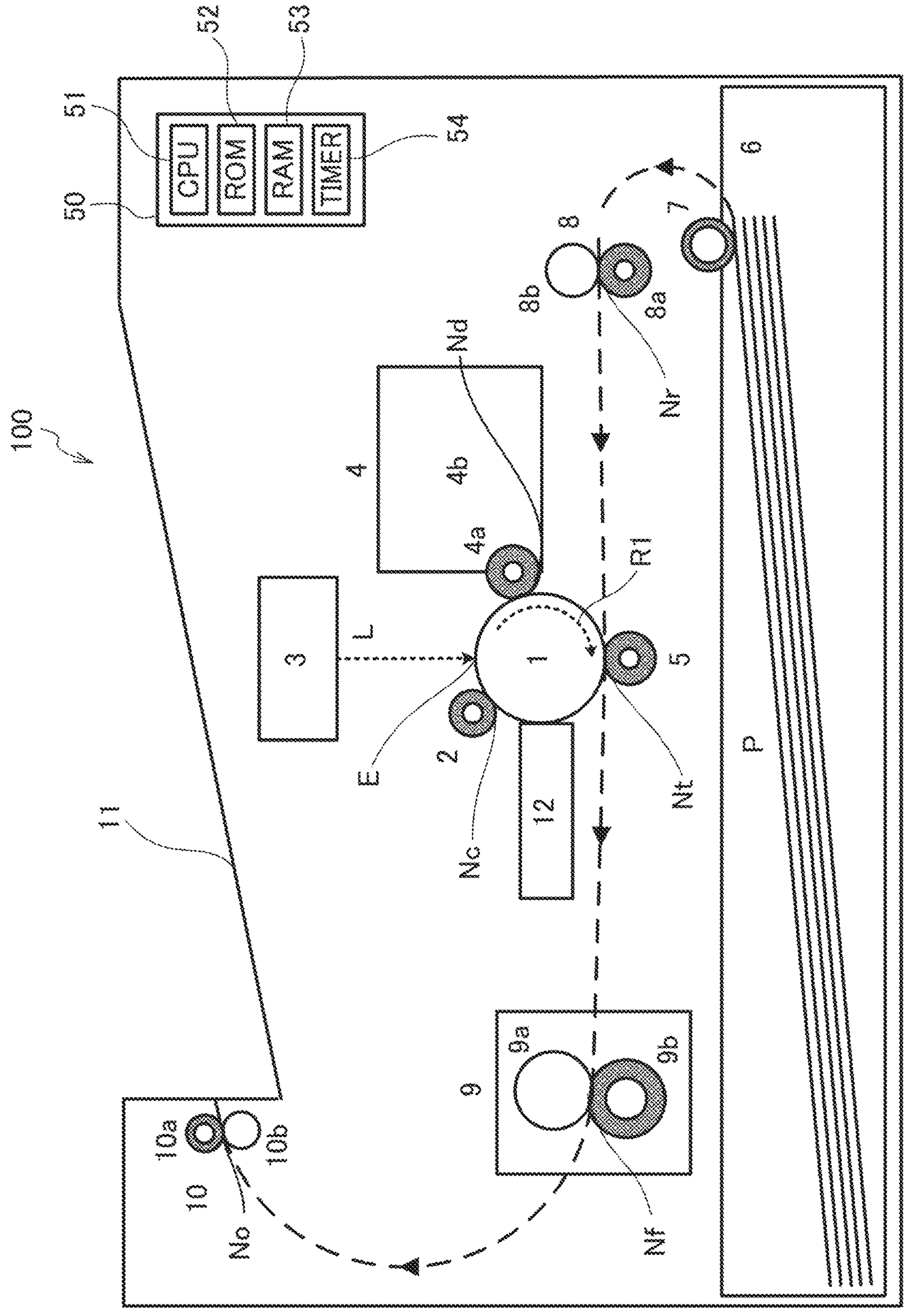
FIG. 1 is a schematic cross-sectional view of an image forming apparatus of an Embodiment 1.

FIG. 1 is a schematic cross-sectional view of an image forming apparatus of an Embodiment 1. An image forming apparatus 100 of the Embodiment 1 is the image forming apparatus of electrophotographic method, which transfers a toner image T (see FIG. 2) on a surface of a photosensitive drum 1, which is an image bearing member, directly onto a recording material P.

First, a forming method of the toner image T on the recording material P will be described. The photosensitive drum 1 is a cylindrical photosensitive member which is rotationally driven in a rotational direction R1 at a predetermined peripheral speed (process speed) by a driving source (not shown). In the Embodiment 1, the photosensitive drum 1 is rotationally driven at the peripheral speed of 230 mm/s when a plain paper is used as the recording material P, for example, and at the peripheral speed of 115 mm/s when a thick paper is used.

Around the photosensitive drum 1, in order along the rotational direction R1, a charging roller 2, an exposure device 3, a developing device 4, a transfer roller 5 and a drum cleaning device 12 are disposed. The charging roller 2, which is a charging means, forms a charging nip portion Nc as a charging portion by contacting the surface of the photosensitive drum 1, and uniformly charges the surface of the photosensitive drum 1 to predetermined potential in the charging nip portion Nc. In the Embodiment 1, the charging roller 2 is rotationally driven by the photosensitive drum 1 as a driving source.

The exposure device 3, which is an exposure means, forms a latent image portion E by selectively scanning and exposing a laser light L modulated according to an image signal on the surface of the photosensitive drum 1, and forms an electrostatic latent image on the surface of photosensitive drum 1 in the latent image portion E. The developing device 4 includes a developing roller 4*a*, which is a developing means, and a developer container 4*b*. The developer container 4*b* supplies toner, which is a developer, to the developing roller 4*a*. The developing roller 4*a* forms a developing nip portion Nd as a developing portion by contacting the surface of the photosensitive drum 1, and develops the toner image T on the surface of the photosensitive drum 1 in the developing nip portion Nd by selectively making the toner adhere according to the electrostatic latent image formed on the surface of the photosensitive drum 1. In the Embodiment 1, the developing roller 4*a* shares a driving source with the photosensitive drum 1 and is rotationally driven at speed ratio of 1.40 relative to the peripheral speed of the photosensitive drum 1.

The transfer roller 5, which is a transfer means, forms a transfer nip portion Nt by contacting the surface of the photosensitive drum 1, and transfers the toner image T developed on the surface of the photosensitive drum 1 (on the image bearing member) to the recording material P in the transfer nip portion Nt. In the Embodiment 1, the transfer roller 5 is rotationally driven by the photosensitive drum 1 or the photosensitive drum 1 via the recording material P as a driving source.

Next, a movement of the recording material P in the image forming apparatus 100 and a fixing method of the toner image T will be described. A sheet feeding roller 7 feeds the recording material P set in a sheet feeding cassette 6 and conveys the recording material P to a registration roller pair 8. In the Embodiment 1, the sheet feeding roller 7 shares the driving source with the photosensitive drum 1 and is rotationally driven at the speed ratio of 1 relative to the peripheral speed of the photosensitive drum 1.

The registration roller pair 8, which is a conveyance means, is constituted by a pair of rotatable members, a registration conveyance roller 8*a* and a registration opposite roller 8*b*. The registration conveyance roller 8*a* forms a conveyance nip portion Nr by contacting the registration opposite roller 8*b*, nips the recording material P in the conveyance nip portion Nr, and conveys the recording material P to the transfer nip portion Nt. At this time, a leading end and a trailing end of the recording material P in a conveyance direction are detected by a sensor (not shown) provided immediately after the registration roller pair 8 (downstream in the conveyance direction), and a control portion 50, which also functions as an acquiring means, acquires a length of the recording material P in the conveyance direction. Incidentally, the length of the recording material P in the conveyance direction can also be acquired as information based on an operation of a printer driver, etc., which is installed in an external device (not shown) such as a personal computer. In addition, the conveyance of the recording material P and the formation of the toner image T are timed by the control portion 50. In the Embodiment 1, the registration conveyance roller 8*a* shares the driving source with the photosensitive drum 1 and is rotationally driven at the speed ratio of 1 in the conveyance nip portion Nr relative to the peripheral speed of the photosensitive drum 1. In addition, the registration opposite roller 8*b* is rotationally driven by the registration conveyance roller 8*a* as a driving source.

The transfer roller 5 transfers the toner image T developed on the surface of the photosensitive drum 1 as described above to the recording material P in the transfer nip portion Nt while nipping and conveying the recording material P to a fixing device 9 in the transfer nip portion Nt.

The fixing device 9, which is a fixing means, will be described in detail in the next section. The fixing device 9 includes a fixing film unit 9*a*, which is a rotatable heating member, and a pressing roller 9*b*, which is a rotatable pressing member.

The pressing roller 9*b* forms a fixing nip portion Nf by contacting the fixing film unit 9*a*, nips the recording material P in the fixing nip portion Nf, and conveys the recording material P to a discharging nip portion No. In addition, the fixing device 9 fixes the unfixed toner image T, which is transferred to the recording material P, to the recording material P by heating and pressurizing. In the Embodiment 1, the pressing roller 9*b* shares the driving source with the photosensitive drum 1 and is rotationally driven at the speed ratio of 1 in the fixing nip portion Nf relative to the peripheral speed of the photosensitive drum 1. However, the speed is set based on a speed when one sheet of a plain paper is passed (fed, conveyed) from a standby state. At this time, an average temperature of the pressing roller 9*b* conveying the recording material P is 70° C. In addition, the fixing film unit 9*a* is rotationally driven by the pressing roller 9*b* or the pressing roller 9*b* via the recording material P as a driving source.

A discharging roller pair 10 is constituted by a discharging conveyance roller 10*a* and a discharging opposite roller 10*b*. The discharging conveyance roller 10*a* forms the discharge nip portion No by contacting the discharging opposite roller 10*b*, conveys the recording material P in the discharge nip portion No to a discharge tray 11, and discharges the recording material P. In the Embodiment 1, the discharging conveyance roller 10*a* shares the driving source with the photosensitive drum 1 and is rotationally driven at the speed ratio of 1 in the discharging nip portion No to the peripheral speed of the photosensitive drum 1. In addition, the discharging opposite roller 10*b* is rotationally driven by the discharging conveyance roller 10*a* as a driving source.

Incidentally, in the transfer process described above, the toner remaining on the surface of photosensitive drum 1 after the transfer is removed and collected by the drum cleaning device 12, which is a cleaning means having a blade (not shown). The drum cleaning device 12 also has effect of helping stabilize the peripheral speed of the photosensitive drum 1 by generating frictional force by having the blade be in contact with the surface of the photosensitive drum 1.

The control portion 50 in the image forming apparatus 100 of the Embodiment 1 includes a calculating means (acquiring means). Here, information on the image is an image type including a black solid image, a halftone, a text and a white solid image and a print ratio of each image type. The control portion 50 acquires the image type (the black solid image, the halftone, the text and the white solid image) and the print ratio thereof for each area sectioned by predetermined lengths in a main scanning direction and a sub scanning direction from the information on the image (hereinafter referred to as "image information") transmitted from the external device such as a personal computer. Here, the main scanning direction is a direction, in which the laser light L emitted from the exposure device 3 is scanned, perpendicular to the conveyance direction of the recording material P. In addition, the sub scanning direction is a direction perpendicular to the main scanning direction, and corresponds to the conveyance direction of the recording material P.

Furthermore, according to the acquired print ratio, the control portion 50 executes suppressing control of blurring, which will be described below. Here, the print ratio is ratio of a toner amount occupying a unit area, for example, for the black solid image, the print ratio is 100%, and for the white solid image, the print ratio is 0%. In addition, the halftone is an image of which the print ratio is not 0% or 100%, but, in particular, the print ratio is 5% or more and 80% or less. In addition, the text can be identified based on slope of the print ratio and connection between printings.

The image forming apparatus 100 is provided with the control portion 50. The control portion 50, which is a control means, is provided with a CPU 51 (central processing unit), a ROM 52 (read only memory), a RAM 53 (random-access memory) and a timer 54. The control portion 50 controls the image forming apparatus 100 by executing programs stored in the ROM 52 in advance by the CPU 51 while using the RAM 53 as a temporary work area. The control portion 50 executes various timing controls while using the timer 54 upon executing the control of the image forming apparatus 100. Incidentally, the control portion 50 may be provided with an ASIC (application specific integrated circuit) or an MPU (micro processing unit). In addition, as a storage media, other storage media such as a hard disk or an optical disk may be used.

(Fixing Device)

Figure 2:
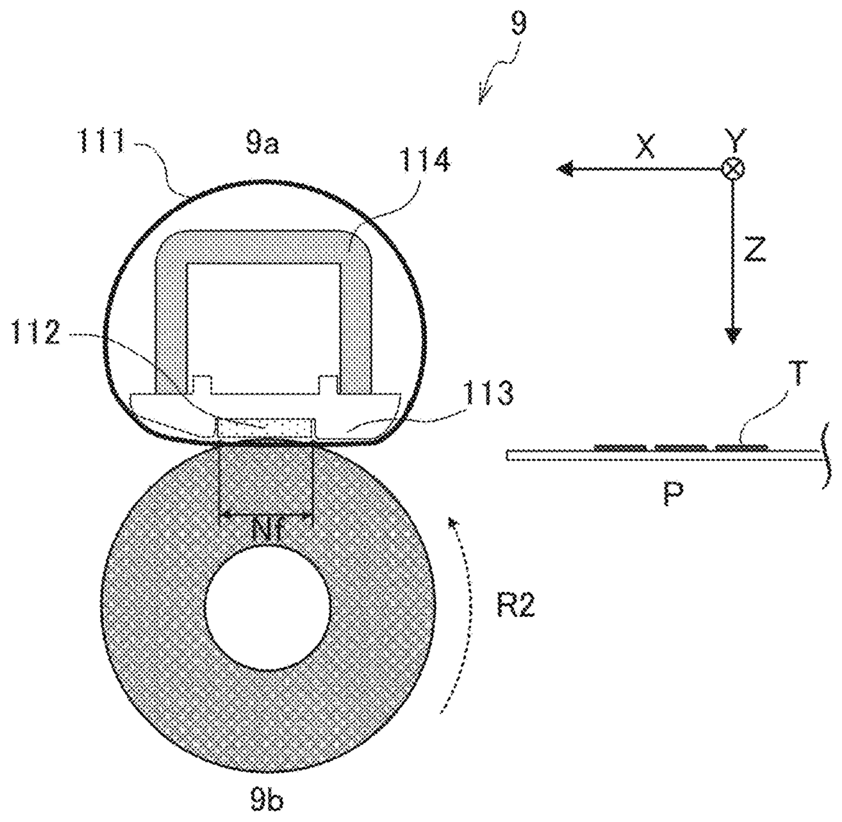
FIG. 2, part (a) and part (b), is a schematic view of a fixing device of the Embodiment 1 and an Embodiment 2.
Figure 2:
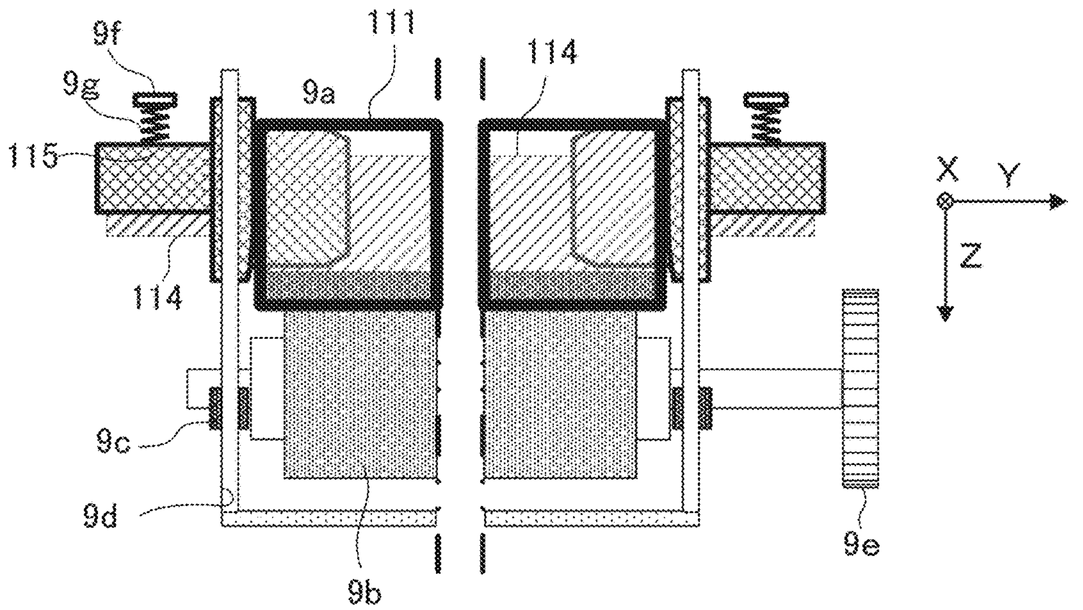

FIG. 2 is a schematic view of the fixing device 9 of the Embodiment 1. Incidentally, in the description below, the conveyance direction of the recording material P in the fixing nip portion Nf is defined as an X direction, and a longitudinal direction (in other words, a rotational axis direction) of each roller, which are rotatable members, is defined as a Y direction. Furthermore, a direction perpendicular to an XY plane and from the fixing film unit 9*a* to the pressing roller 9*b* is defined as a Z direction. Part (a) of FIG. 2 is a schematic cross-sectional view in an XZ plane near a central portion in the longitudinal direction of the fixing device 9 of the Embodiment 1, and part (b) of FIG. 2 is a schematic view in a YZ plane. The fixing device 9 of the Embodiment 1 is a fixing device of an on-demand heating method for reduction of start-up time and power consumption.

The fixing device 9 is constituted by the fixing film unit 9*a*, the pressing roller 9*b*, a pressing roller bearing 9*c*, a fixing device frame 9*d*, a pressing roller driving gear 9*e*, a pressure spring supporting portion 9*f* and a fixing pressure spring 9*g*. The fixing film unit 9*a* is constituted by a fixing film 111, a heater 112, a heater holder 113, a pressing stay 114 and a fixing flange 115.

First, a shape and function of each member will be described. The fixing film 111 is a cylindrical endless belt containing the heater 112, the heater holder 113 and the pressing stay 114, and, by receiving frictional force corresponding to pressuring force from the pressing roller 9*b* or the recording material P, the fixing film 111 is rotationally driven by a rotation of the pressing roller 9*b* in a direction of an arrow R2. In addition, the fixing film 111 transmits heat from the heater 112 to the pressing roller 9*b*, the recording material P and the toner image T.

The heater 112 generates the heat while being held by the heater holder 113, and heats the pressing roller 9*b*, the recording material P and the toner image T via the fixing film 111, which is sliding on a surface of the heater 112.

In the Embodiment 1, in order to efficiently transfer the heat, a center of the heater 112 and a center of the pressing roller 9*b* are aligned in the X direction. The heater holder 113 has an approximately semicircular arc bucket shape in a cross section thereof, and fixedly supports the heater 112 by fitting the heater 112 into a groove portion provided therein. In addition, the heater holder 113 is what holds the heater 112, but also serves to guide the rotation of the fixing film 111 by loosely fitting the fixing film 111 to this heater holder 113.

The pressing stay 114 is located along the longitudinal direction of the heater holder 113 and maintains a shape of the fixing film unit 9*a*, which is pressed opposite to the pressing roller 9*b*, over the longitudinal direction. The fixing flange 115 stabilizes the rotation and bias of the fixing film 111 by supporting inner periphery of both end portions in the longitudinal direction of the fixing film 111. In addition, by fitting to both end portions of the pressing stay 114, the fixing flange 115 becomes a point of action for pressuring the fixing film unit 9*a* and the pressing roller 9*b*.

The fixing roller 9*b* receives the fixing film unit 9*a*, to which force is applied in a direction toward the fixing roller 9*b* by the fixing pressure spring 9*g*, with the pressing roller bearings 9*c*, in which both end portions of a core metal of the fixing roller 9*b* in the longitudinal direction are fitted to the fixing device frame 9*d*. By this, the fixing nip portion Nf is formed by being pressured by predetermined pressuring force. Incidentally, one end of the fixing pressure spring 9*g* is supported by the pressure spring supporting portion 9*f*. And the pressing roller driving gear 9*e* is fitted to the core metal of the pressing roller 9*b*, and the driving force, which is from the driving source common to the photosensitive drum 1, is transmitted from a drive transmitting mechanism portion (not shown). As a result, both end portions in the longitudinal direction of the core metal of the pressing roller 9*b* slide against the pressing roller bearing 9*c* and the pressing roller 9*b* is rotationally driven at the predetermined speed in the direction of the arrow R2 shown in part (a) of FIG. 2. As described above, the fixing device 9 while fixing the toner image T, which is transferred to the recording material P, to the recording material P by heating and pressuring the toner image T, nips the recording material P with the fixing nip portion Nf, and conveys the recording material P to the discharging nip portion No.

Next, dimensions and material of each member will be described. The fixing film 111 of the Embodiment 1 has an inner diameter of 18 mm and is configured to have multiple layers in a thickness direction. The layers of the fixing film 111 include a base layer to maintain strength of the film and a releasing layer to reduce dirt adhesion to a surface thereof. Material of the base layer needs to have heat resistance for receiving the heat from the heater 112, and in addition, the base layer also needs to have strength for sliding against the heater 112 and the heater holder 113. Because of these reasons, for the base layer, metal such as stainless steel and nickel, or heat-resistant resin such as polyimide should be used.

In the Embodiment 1, polyimide resin is used as the material for the base layer of the fixing film 111 with adding carbon filler to improve thermal conductivity and the strength. The thinner the thickness of the base layer is, the easier the base layer is to transfer the heat emitted from the heater 112 to the pressing roller 9*b*. However, when the thickness of the base layer gets thinner, the strength thereof is reduced, and therefore, it is preferable for the thickness to be about from 15 μm to 100 μm, and in the Embodiment 1, the thickness is set to 60 μm.

For material of the releasing layer of the fixing film 111, it is preferable to use fluoropolymer such as perfluoroalkoxy resin (PFA), polytetrafluoroethylene resin (PTFE) and tetrafluoroethylene-hexafluoropropylene resin (FEP). In the Embodiment 1, PFA, which has excellent releasing property and heat resistance among the fluoropolymers, is used. The releasing layer may be a coated tube or a surface coated with paint. In the Embodiment 1, the releasing layer is formed by a coat which excels in thin-wall molding. The thinner the releasing layer is, the easier to transfer heat of an inner surface of the fixing film 111 to the outer surface of the fixing film 111; however, if the releasing layer is too thin, durability thereof is reduced. Therefore, a thickness of the releasing layer is preferably about from 5 μm to 30 μm, and in the Embodiment 1, the thickness is set to be 15 μm. In addition, although not used in the Embodiment 1, an elastic layer may be provided between the base layer and the releasing layer. In such a case, for material of the elastic layer, silicone rubber or fluororubber may be used.

The heater 112 of the Embodiment 1 is a general heater used in fixing devices of a film heating method, and what is provided with a resistance heat generating member on a ceramic substrate. The heater 112 has an alumina substrate with a width of 6 mm in the X direction and a thickness of 1 mm in the Z direction, of which the resistance heat generating member of Ag/Pd (silver-palladium) is coated with a thickness of about 10 μm by screen printing on a surface. In addition, the resistance heat generating member, which is covered by a glass having a thickness of 50 μm for protection of the heating member and ensuring sliding property, is used. In addition, a temperature of the heater 112 is adjusted by the control portion 50 appropriately controlling current flowing to the resistance heat generating member in response to a signal output from a temperature detecting element (not shown) which detects temperature of the ceramic substrate or the fixing film 111.

For the heater holder 113 of the Embodiment 1, SUMIKASUPER (registered trademark) manufactured by Sumitomo Chemical Co., Ltd., which is a liquid crystal polymer resin having high heat resistance, is used to satisfy the heat resistance and rigidity. For the pressing stay 114, it is general to use high rigid material such as iron or stainless steel to maintain the shape of the pressured fixing film unit 9*a* in the longitudinal direction. In the Embodiment 1, as the pressing stay 114, a steel sheet metal to which a bending method is applied is used.

For the fixing flange 115 of the Embodiment 1, similar to the heater holder 113, SUMIKASUPER (registered trademark) manufactured by Sumitomo Chemical Co., Ltd., which is a liquid crystal polymer resin having high heat resistance, is used to satisfy the heat resistance and rigidity The pressing roller 9*b* of the Embodiment 1 has an outer diameter of 20 mm, and includes a steel core metal with a diameter of 13 mm, an elastic layer with a thickness of 3.5 mm, and a releasing layer with a thickness of 30 μm. In general, for material of the elastic layer, solid rubber or foamed rubber is used. The foam rubber has a low heat capacity and low thermal conductivity, making it difficult for heat from the surface of the pressing roller 9*b* to be absorbed into an inside, and thus making it easier for surface temperature of the pressing roller 9*b* to rise; therefore, the foam rubber has advantage in reducing rising time of the fixing. In the Embodiment 1, the foam rubber in which silicone rubber is foamed is used.

The outer diameter of the pressing roller 9*b* needs to have moderate diameter since while a smaller outer diameter reduces heat capacity, a smaller diameter narrows a width of the fixing nip portion Nf. On the elastic layer, as a releasing layer of the toner, a releasing layer made of perfluoroalkoxy resin (PFA) is formed. The releasing layer, similar to the releasing layer of the fixing film 111, may be a coated tube or a surface coated with paint. Incidentally, in the Embodiment 1, a tube having excellent durability is used. For material of the releasing layer, in addition to the PFA, fluoropolymers such as the PTFE and the FEP, and fluororubber or silicone rubber having good releasing property may be used. When surface hardness of the pressing roller 9*b* gets lower, the wider fixing nip portion Nf can be obtained with lighter pressure (smaller pressuring force). In the Embodiment 1, material having an Asker-C hardness (4.9 N load) of 50° is used. In the Embodiment 1, the pressuring force is 14 kgf and a width in the X direction of the fixing nip portion Nf is about 6.0 mm.

(Mechanism of Occurrence of the Blurring)

Figure 3:
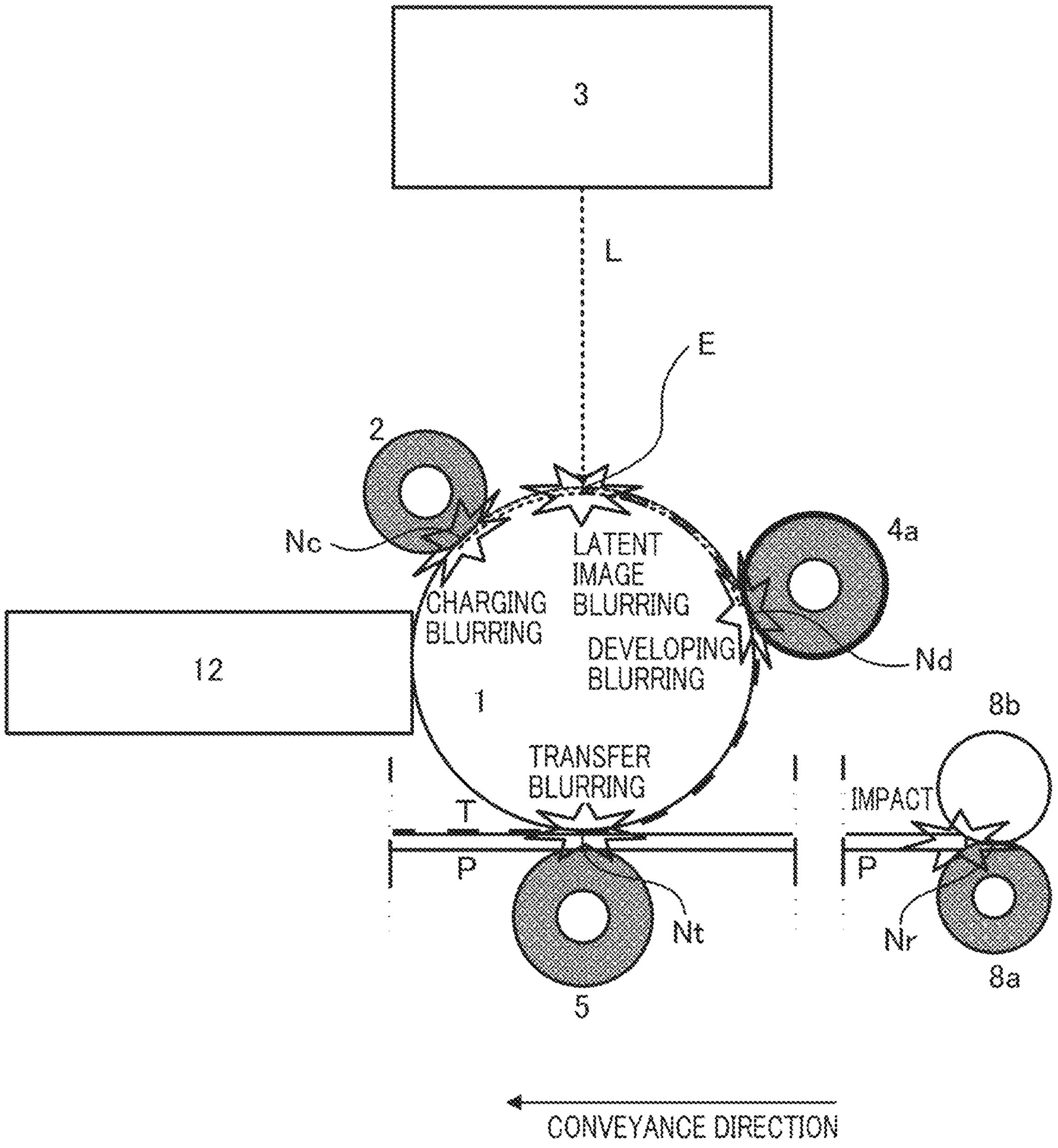
FIG. 3 is a schematic cross-sectional view illustrating a mechanism of occurrence of blurring in the Embodiment 1.

Before explaining the blurring suppressing control of the present invention, mechanism of occurrence of the blurring will be described using FIG. 3. FIG. 3 is a schematic cross-sectional view adjacent to the photosensitive drum 1. At a timing when the trailing end of the recording material P in the conveyance direction exits (passes through) the conveyance nip portion Nr, in response to a loosening amount and rigidity of the recording material P, which is between the transfer nip portion Nt and the conveyance nip portion Nr, a momentary movement of the recording material P occurs to eliminate loosening. This momentary movement of the recording material P is transmitted to the transfer nip portion Nt via the recording material P as an impact. Here, the blurring in the present invention is image defect which occurs due to the impact described above, and in the Embodiment 1, there is a possibility that four types of the blurring occur.

A first type is the blurring which occurs in the transfer nip portion Nt, and hereinafter referred to as "transfer blurring". Due to the impact described above, difference in speed between the peripheral speed of the photosensitive drum 1 and the conveyance speed of the recording material P in the transfer nip portion Nt fluctuates momentarily. The transfer blurring is a phenomenon which appears as unevenness in density and expansion and contraction of characters since the toner image T, which is being transferred in the transfer nip portion Nt, is disturbed by this momentary fluctuation of the difference in speed.

A second type is the blurring which occurs in the developing nip portion Nd, and hereinafter referred to as "developing blurring". Due to the impact described above, in a case in which the peripheral speed of the photosensitive drum 1 fluctuates momentarily, difference in speed between the peripheral speed of the photosensitive drum 1 and the peripheral speed of the developing roller 4*a* fluctuates momentarily. The developing blurring is a phenomenon which appears as the unevenness in density and the expansion and contraction of characters since the toner image T, which is being developed in the developing nip portion Nd, is disturbed by this momentary fluctuation of the difference in speed.

A third type is the blurring which occurs in the latent image portion E, and hereinafter referred to as "latent image blurring". Due to the impact described above, in the case in which the peripheral speed of the photosensitive drum 1 fluctuates momentarily, a local misalignment occurs between a moving interval (distance) of the surface of the photosensitive drum 1 and an irradiation interval (distance) of the laser light L in a peripheral direction of the photosensitive drum 1. The latent image blurring is a phenomenon which appears as the unevenness in the density of the toner image T, which is subsequently formed, and the expansion and contraction of characters since the electrostatic latent image, which is being formed in the latent image portion E, is disturbed by this local misalignment.

A fourth type is the blurring which occurs in the charging nip portion Nc, and hereinafter referred to as "charging blurring". Due to the impact described above, in the case in which the peripheral speed of the photosensitive drum 1 fluctuates momentarily, difference in speed between the peripheral speed of the photosensitive drum 1 and the peripheral speed of the charging roller 2 fluctuates momentarily. The charging blurring is a phenomenon which appears as the unevenness in the density of the toner image T, which is subsequently formed, since unevenness occurs in surface potential of the photosensitive drum 1, which is being charged in the charging nip portion Nc, due to this momentary fluctuation of the difference in speed.

The three types of the blurring of the developing blurring, the latent image blurring and the charging blurring may occur in the case in which the peripheral speed of the photosensitive drum 1 fluctuates momentarily. A configuration of the image forming apparatus 100 in which these three types of blurring are likely to occur is a cleaner-less configuration, which does not have the drum cleaning device 12, which has the effect of stabilizing the peripheral speed of the photosensitive drum 1 by friction. In addition, the blurring is also likely to occur in a configuration in which the pressuring force is strong in the transfer nip portion Nt.

All four types of blurring occur when the transfer, the development, the latent imaging and the charging, which are the processes relating to the image formation, are performed at the timing when the impact described above occurs. In other words, at the timing described above, if there is no printing (toner image) in the image which is being formed in each process, no blurring occurs.

Incidentally, the impact described above occurs in a range from a timing when the trailing end of the recording material P is conveyed out of the conveyance nip portion Nr to a timing when there is no longer any contact between the trailing end of the recording material P and the conveyance nip portion Nr.

Incidentally, since the blurring changes visibility thereof according to magnitude of the impact, the blurring changes visibility thereof according to the loosening amount, rigidity and basis weight of the recording material P. In the Embodiment 1, when the recording materials P such as thick papers having large thermal capacity are conveyed and fixed continuously, the pressing roller 9*b* is cooled and contracts, and the loosening amount of the recording material P becomes large, causing the blurring likely to occur.

(Loosening Amount)

Figure 4:
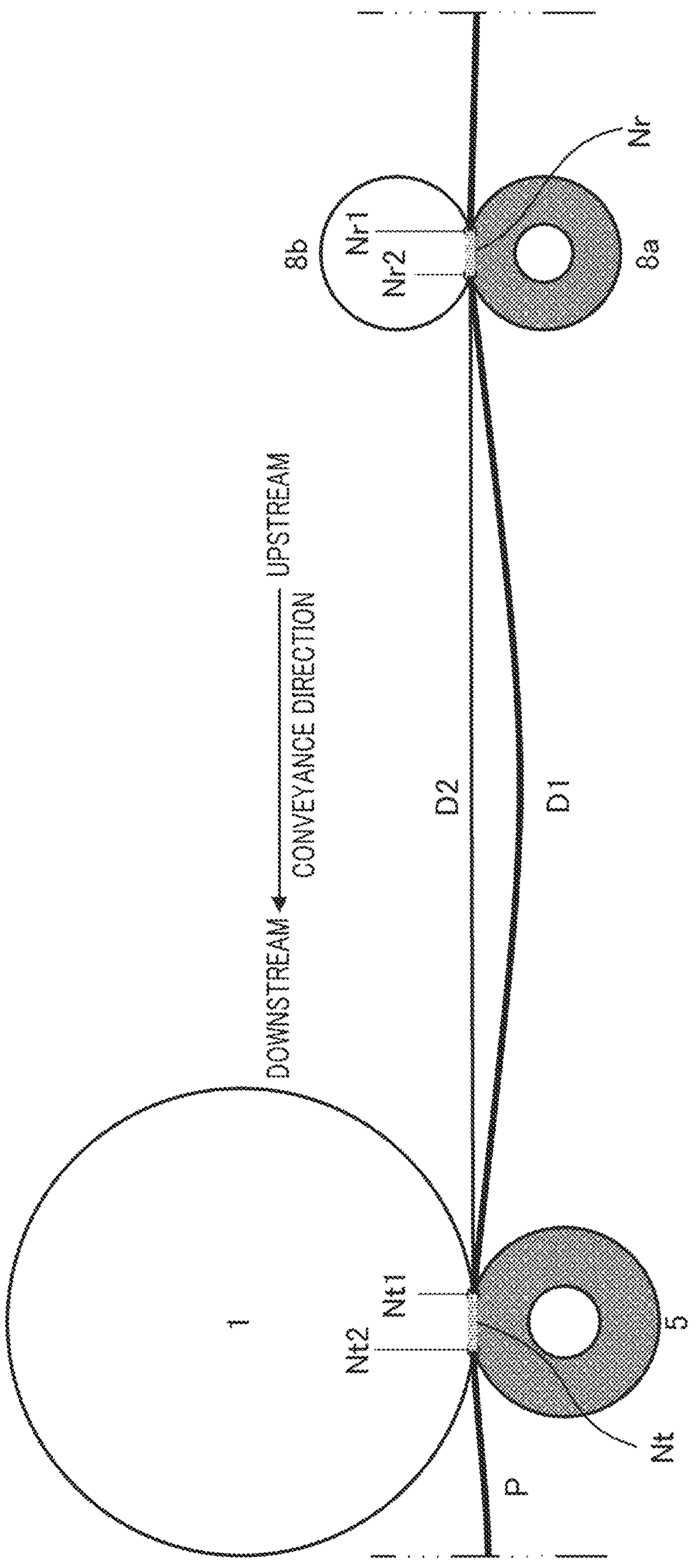
FIG. 4 is a schematic cross-sectional view illustrating a loosened state of a recording material in the Embodiment 1.

A loosening amount S in the present invention will be described. FIG. 4 is a schematic cross-sectional view illustrating a loosened state of the recording material P. First, a definition of the loosening amount S in the present invention will be described using FIG. 4. In the present invention, difference between a length D1 and a length D2 is defined as the loosening amount S (S=D1−D2). Incidentally, the length D1 is a length of the recording material P which is nipped from a downstream end Nr2 of the conveyance nip portion Nr to an upstream end Nt1 of the transfer nip portion Nt. The length D2 is a length of a straight line from the downstream end Nr2 of the conveyance nip portion Nr to the upstream end Nt1 of the transfer nip portion Nt. In addition, in each nip portion, the upstream end is an end portion of an upstream side of the nip portion in the conveyance direction of the recording material P, and the downstream end is an end portion of a downstream side of the nip portion in the conveyance direction of the recording material P.

The loosening amount S at a timing T1 when the leading end of the recording material P enters the fixing nip portion Nf is defined as a loosening amount upon fixing entry S1, and the loosening amount S at a timing T2 when the trailing end of the recording material P exits the conveyance nip portion Nr is defined as a loosening amount upon conveyance exit S2. Then, the loosening amount upon conveyance exit S2 is a length combining the loosening amount upon fixing entry S1 and change in the loosening amount S1' between the timing T1 and the timing T2 (S2=S1+S1').

Here, an average value of a conveyance speed Vr of the recording material P, which is in the conveyance nip portion Nr, between the timing T1 and the timing T2 is defined as an average value Vr12. In addition, an average value of the conveyance speed Vt of the recording material P, which is in the transfer nip portion Nt, between the timing T1 and the timing T2 is defined as an average value Vt12. Then, the change in the loosening amount S1' between the timing T1 and the timing T2 is the average value Vr12 minus the average value Vt12 multiplied by time T12, which is time between the timing T1 and the timing T2 (S1'=(Vr12−Vt12)×T12).

The time T12 can be calculated from a length PL of the recording material P, a distance between the conveyance nip portion Nr and the transfer nip portion Nt, a distance between the transfer nip portion Nt and the fixing nip portion Nf, and the conveyance speed Vr of the recording material P in the conveyance nip portion Nr. Here, the length of the recording material P is large enough relative to the loosening amount S; therefore, effect of the loosening on the time T12, which is the time between the timing T1 and the timing T2, is ignored in the Embodiment 1.

Nipping pressure in the conveyance nip portion Nr is generally set to strong pressure to convey the recording material P without causing slippage. In the Embodiment 1, the slippage of the recording material P in the conveyance nip portion Nr did not occur. On the other hand, the nipping pressure in the transfer nip portion Nt is generally set to weaker pressure relative to the nipping pressure in the conveyance nip portion Nr and the nipping pressure in the fixing nip portion Nf. Therefore, the conveyance speed Vt of the recording material P in the transfer nip portion Nt is likely to be affected by occurrence of the slippage due to the conveyance speed Vf of the recording material P in the fixing nip portion Nf and the rigidity of the recording material P, etc. In the Embodiment 1, a slipping amount is estimated from the conveyance speed Vf of the recording material P in the fixing nip portion Nf, a type of the recording material P, and the nipping pressure in the transfer nip portion Nt, and then the conveyance speed Vt of the transfer nip portion Nt is estimated.

In the Embodiment 1, the conveyance speed Vf of the recording material P in the fixing nip portion Nf fluctuates depending on the outer diameter of the pressing roller 9*b*, which is rotationally driven. The outer diameter of the pressing roller 9*b* fluctuates due to effect of thermal expansion caused by temperature change in the pressing roller 9*b*. In the Embodiment 1, by performing temperature prediction of the fixing roller 9*b*, the estimation of the conveyance speed Vf of the recording material P in the fixing nip portion Nf is performed.

As described above, the loosening amount upon conveyance exit S2, which is the loosening amount S at the timing T2 when the trailing end portion of the recording material P exits the conveyance nip portion Nr, can be estimated. Incidentally, the loosening amount S may be detected directly in the image forming apparatus 100 by a loop sensor, etc., or the conveyance speed of the recording material P or the outer diameter and the temperature of the pressing roller 9*b* may be directly measured. Incidentally, in the blurring suppressing control of the Embodiment 1, in order to control a conveyance interval between the preceding recording material P1 (first recording material) and the following recording material P2 (second recording material), which is conveyed following the recording material P1, the following is required. That is, the control portion 50 needs to estimate, before feeding the following recording material P2, the loosening amount upon conveyance exit S2 upon conveying the following recording material P2.

(Estimating Method of the Loosening Amount Upon Conveyance Exit S2)

Hereinafter, an example of an estimating method of the loosening amount upon conveyance exit S2 upon conveying the following recording material P2 of the Embodiment 1 will be described. Conveyance conditions of the recording material P2 are as follows: letter size (with the length in the conveyance direction of 279.4 mm), thick paper with the basis weight of 163 $g/m^2$, thick paper mode (with the process speed of 115 mm/s), and 10 pages continuous printing on one side. The above information is input to the control portion 50 of the image forming apparatus 100 based on operation of a printer driver, etc., which is installed in the external device, such as a personal computer. Incidentally, the recording material P2 is not limited to the thick paper, but may be other types of paper, for example, having the basis weight of 90 $g/m^2$ or more.

First, the distance between the conveyance nip portion Nr and the transfer nip portion Nt in the image forming apparatus 100 of the Embodiment 1 is 100 mm, the distance between the transfer nip portion Nt and the fixing nip portion Nf is 120 mm, and the loosening amount upon fixing entry S1 under the conveyance conditions described above is 1.2 mm. In addition, the conveyance speed Vr of the recording material P in the conveyance nip portion Nr is set to have the speed ratio of 1 to the process speed, however, maximum speed ratio is 1.005 when outer diameter tolerance of the registration conveyance roller 8*a* is considered. Therefore, in order to estimate maximum loosening amount, estimating calculation of the loosening amount S2 is performed with taking the conveyance speed of the recording material P in the conveyance nip portion Nr as 115.575 mm/s. The information described above is stored in advance as data in a memory portion such as the ROM 52.

Here, based on an equation (1) below, it is found that the time T12, which is the time between the timing T1 and the timing T2, is 0.514 s.

$$\begin{aligned} T12 &= (279.4 - 100 - 120)/115.575 \\ &= 0.514 \end{aligned} \qquad \text{Eqaution (1)}$$

Next, in order to estimate the maximum loosening amount, the loosening of the recording material P occurring between the timing T1 and the timing T2 is considered to be increased only between the transfer nip portion Nt and the conveyance nip portion Nr due to the slippage of the recording material P in the transfer nip portion Nt. Therefore, the conveyance speed Vt of the recording material P in the transfer nip portion Nt can be regarded as the conveyance speed Vf of the recording material P in the fixing nip portion Nf.

Here, for example, in a condition in which a third page is being printed and before a fourth page is fed, the loosening amount upon conveyance exit S2 upon conveying the fourth page is estimated. Upon conveying the fourth page of recording material P, an average of predicted temperature of the pressing roller 9*b* between the timing T1 and the timing T2 is 57° C., and the speed ratio to the process speed converted from degree of contraction of the pressing roller 9*b* at that time is 0.980. Incidentally, this converting formula is also stored as data in advance in the ROM 52, etc.

Therefore, based on the following equation (2), it is found that the conveyance speed Vf of the recording material P in the fixing nip portion Nf upon conveying the fourth page of the recording material P is 112.700 mm/s. In addition, at the same time, the conveyance speed Vt of the recording material P in the transfer nip portion Nt, is also 112.700 mm/s.

$$\begin{aligned} Vf &= 115.000 \times 0.980 \\ &= 112.700 \end{aligned} \qquad \text{Equation (2)}$$

Therefore, based on the following equation (3), it is found that the change in the loosening amount S1' is 1.5 mm.

$$\begin{aligned} S1' &= (115.575 - 112.700) \times 0.514 \\ &= 1.5 \end{aligned} \qquad \text{Equation (3)}$$

Therefore, based on the following formula (4), the loosening amount upon conveyance exit S2 upon conveying the recording material P2 is 2.7 mm.

$$\begin{aligned} S2 &= 1.2 + 1.5 \\ &= 2.7 \end{aligned} \qquad \text{Equation (4)}$$

(Region where the Blurring Occurs)

Next, a region where the blurring occurs will be described using FIG. 5 by taking the transfer blurring as an example. In Part (a) of FIG. 5, a view, in which a schematic cross-sectional view illustrating the loosened state of the recording material P at a moment when the trailing end of the recording material P exits the conveyance nip portion Nr is overlapped with a timing of formation of the image information, is illustrated. At this moment, the loosening with the loosening amount upon conveyance exit S2 occurs in the recording material P. In addition, broken line arrows in the figure indicate moving directions of the image information and the recording material P. As shown in part (a) of FIG. 5, due to the loosening of the recording material P, in the transfer nip portion Nt, positional misalignment between the image information and the recording material P and the toner image T on the recording material P occurs by the loosening amount upon conveyance exit S2. From this timing, there is a possibility that the transfer blurring occurs in the transfer nip portion Nt by the impact described above occurring. At this moment, the downstream end Nt2 of the transfer nip portion Nt in the image information is defined as a first region end E1 in the image information, and the downstream end Nt2 of the transfer nip portion Nt on the recording material P is defined as a first region end E1' of the recording material P. The first region end E1 in the image information has a length, from the trailing end of the image information, which is a length combining the length of the straight line from the downstream end Nr2 of the conveyance nip portion Nr to the upstream end Nt1 of the transfer nip portion Nt with the loosening amount upon conveyance exit S2 of the recording material P.

Figure 5:
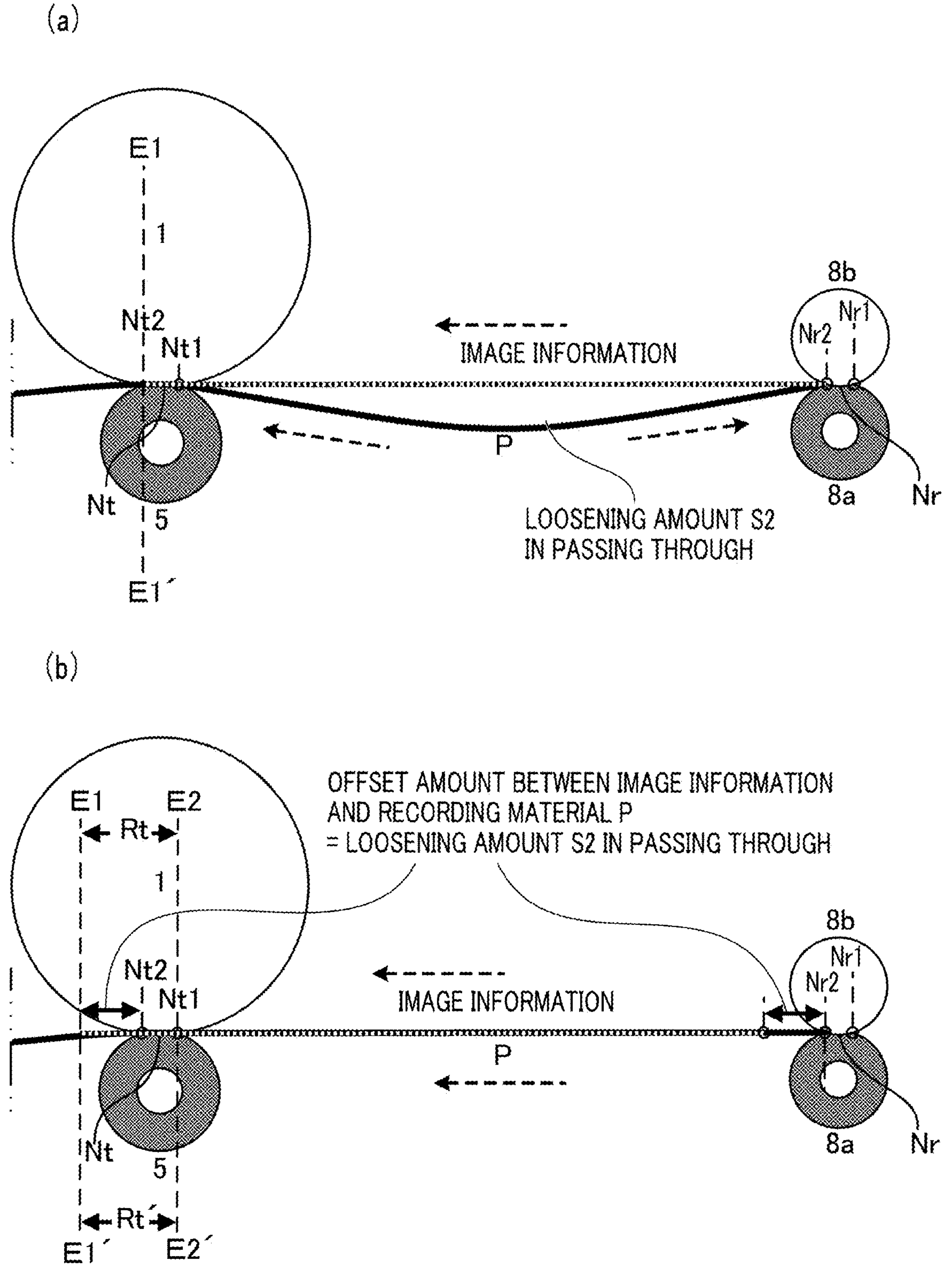
FIG. 5, part (a) and part (b), is a view illustrating the loosened state of the recording material and a forming timing of image information in the Embodiment 1.

Next, in part (b) of FIG. 5, a view, in which a schematic cross-sectional view illustrating a state of the recording material P at a moment when the loosening with the loosening amount upon conveyance exit S2 has occurred in the recording material P is resolved and the trailing end of the recording material P is no longer in contact with the conveyance nip portion Nr is overlapped with the timing of the formation of the image information, is illustrated. As shown in part (b) of FIG. 5, by the loosening amount upon conveyance exit S2, the positional misalignment between the image information and the recording material P and the toner image T on the recording material P occurs.

Until this timing, there is the possibility that the transfer blurring occurs in the transfer nip portion Nt by the impact described above occurring. Thus, at this moment, the upstream end Nt1 of the transfer nip portion Nt in the image information is defined as a second region end E2 in the image information, and the upstream end Nt1 of the transfer nip portion Nt on the recording material P is defined as a second region end E2' of the recording material P. A region where the transfer blurring occurs Rt in the image information is a region between the first region end E1 in the image information and the second region end E2 in the image information. A length of this region is a length combining a length from the upstream end Nt1 to the downstream end Nt2 of the transfer nip portion Nt with the loosening amount upon conveyance exit S2.

In addition, a region where the transfer blurring occurs Rt' on the recording material P is a region between the first region end E1' of the recording material P and the second region end E2' of the recording material P, and is the same as the region where the transfer blurring occurs Rt in the image information (Rt'=Rt). And the region where the transfer blurring occurs Rt in the image information is a region shifted to the trailing end side of the recording material P by the length of the loosening amount upon conveyance exit S2 relative to the region where the transfer blurring occurs Rt' of the recording material P, on which the image is actually formed.

In the developing blurring, the latent image blurring and the charging blurring, relative to the transfer blurring, the first region end E1' of the recording material P is shifted to the trailing end side in the conveyance direction by a distance on a circumference of the photosensitive drum 1 from the transfer nip portion Nt to each developing nip portion Nd, the latent image portion E and the charging nip portion Nc. In addition, as in cases of the developing blurring, the latent image blurring and the charging blurring, as well as the transfer blurring described above, there is the positional misalignment between the image information and the toner image T formed on the recording material P by the loosening amount upon conveyance exit S2 of the recording material P.

(Blurring Suppressing Control in a Comparative Example)

Figure 6:
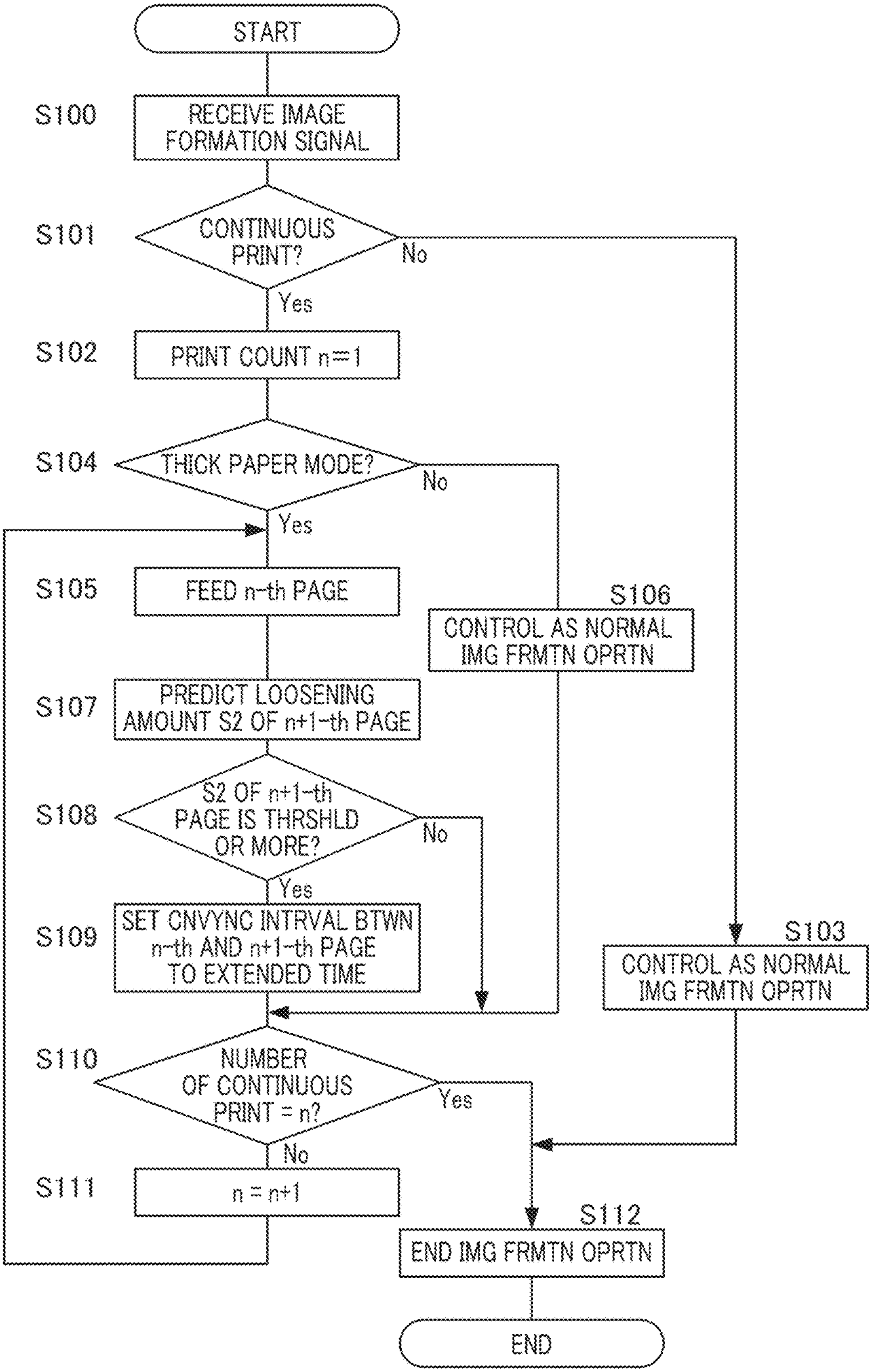
FIG. 6 is a flow chart illustrating blurring suppressing control for comparing with the Embodiment 1.

Blurring suppressing control in a Comparative Example will be described using FIG. 6. FIG. 6 is a schematic flow chart of the blurring suppressing control for comparison with the present Embodiment. As shown in FIG. 6, in step (hereinafter referred to as S) 100, the control portion 50 receives an image formation signal. In S101, the control portion 50 determines whether or not a print job is a continuous print. If the control portion 50 determines in S101 that the print job is the continuous print, the process then proceeds to S102, and if the control portion 50 determines that the print job is not the continuous print, the process then proceeds to S103. In S103, the control portion 50 transitions to control as the normal image forming operation, in other words, control without executing conveyance interval extension, and the process proceeds to S112. In S112, the control portion 50 terminates the image forming operation and ends a series of the processes.

In S102, the control portion 50 sets a print count n=1. In S104, the control portion 50 determines whether or not a print mode is a thick paper mode. If the control portion 50 determines in S104 that the print mode is the thick paper mode, the process then proceeds to S105, and if the control portion 50 determines that the print mode is not the thick paper mode, the process then proceeds to S106. In S106, the control portion 50 transitions to the control as the normal image forming operation, in other words, to the control without executing the conveyance interval extension, and the process proceeds to S110.

In S105, the control portion 50 feeds an nth (1st, at this point) page and starts the image formation. In S107, the control portion 50 estimates the loosening amount upon conveyance exit S2 of the next print, i.e., an (n+1)th (2nd, at this point) page. The estimating method of the loosening amount upon conveyance exit S2 is as described above. In S108, the control portion 50 determines whether or not the loosening amount upon conveyance exit S2 of the (n+1)th (2nd, at this point) page is a threshold value or more (a predetermined threshold value or more). If the control portion 50 determines in S108 that the loosening amount upon conveyance exit S2 is the threshold value or more, the process then proceeds to S109, and if the control portion determines that it is less than the threshold value, the process then proceeds to S110.

In S109, the control portion 50 sets the conveyance interval between the nth (1st, at this point) page and the (n+1)th (2nd, at this point) page to a time extended by a predetermined time. The predetermined time is a time corresponding to a shifting amount between the image information and the recording material P2, i.e., the loosening amount upon conveyance exit S2, as described in FIG. 5, or sufficient time for the loosening amount upon conveyance exit S2 to be eliminated. In S110, the control portion 50 determines whether or not a number of the continuous prints of the received image formation signal equals to the print count n (1, at this point), i.e., whether or not all numbers of the prints have been completed. If the control portion 50 determines in S110 that all printing has not been completed, the process then proceeds to S111, and if the control portion 50 determines that all printing has been completed, the process then proceeds to S112. In S111, the control portion 50 counts up the print count n=n+1, returns the process to S105, and repeats the process from S105. After repeating the process, the control portion 50 terminates the image forming operation when the determination result in S110 becomes Yes (S112).

In the blurring suppressing control according to the Comparative Example described above, in a case in which the loosening amount upon conveyance exit S2 becomes large during the continuous print of the thick papers, the blurring can be suppressed by extending the conveyance interval. However, with the blurring suppressing control according to the Comparative Example, the conveyance interval is extended even when there is no image in the region where the blurring occurs, resulting in decrease of productivity.

(Blurring Suppressing Control of the Embodiment 1)

The blurring suppressing control of the Embodiment 1 will be described using FIG. 7. Since the configuration of the image forming apparatus 100 of the Embodiment 1 is a configuration having the drum cleaning device 12 which has the effect of stabilizing the peripheral speed of the photosensitive drum 1 by friction, any of the developing blurring, the latent image blurring, and the charging blurring do not occur.

Therefore, the blurring suppressing control of the Embodiment 1 is intended to suppress the transfer blurring.

In the Embodiment 1, the control portion 50 acquires, as the image information, all image types (the solid black image, the halftone, the text and the white solid image) and the print ratio of each image type for each region sectioned by the predetermined lengths in the main scanning direction and the sub scanning direction, and calculates the print ratio in the region where the transfer blurring occurs Rt. Then, as determination for the conveyance interval extension, it is configured that if the print ratio in the region where the transfer blurring occurs Rt exceeds 0% (when the toner image is present), the conveyance interval extension is executed. Incidentally, regarding the image types, it may be configured that only the print ratio of the halftone and the text, in which the blurring is easily visible, is acquired and used for the determination whether or not the image is present in the region where the blurring occurs.

Figure 7:
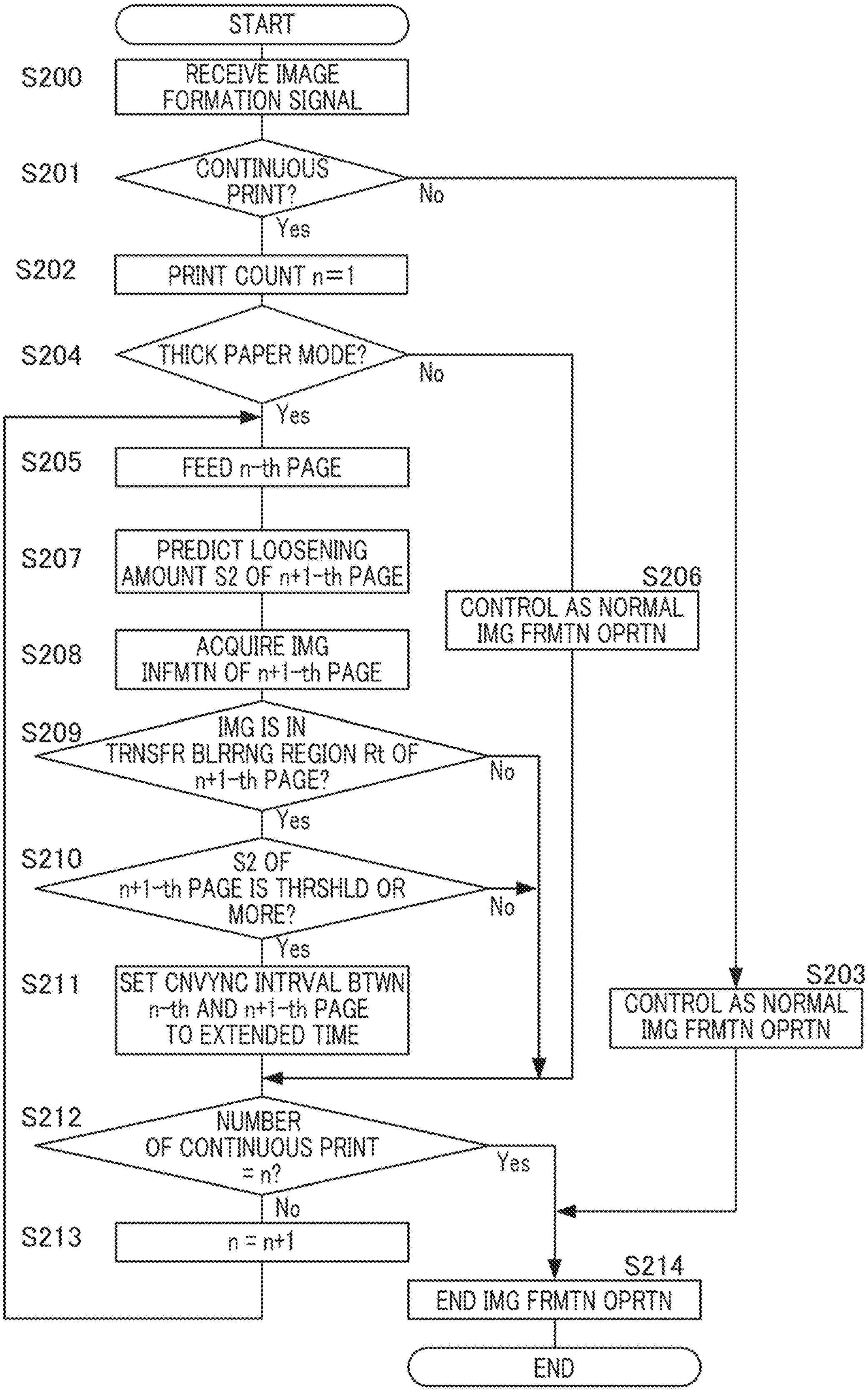
FIG. 7 is a flow chart illustrating the blurring suppressing control of the Embodiment 1.

FIG. 7 is a schematic flow chart of the blurring suppressing control of the Embodiment 1. Incidentally, since S200 through S207 and S210 through S214 are the same processes as S100 through S112 in FIG. 6, the description thereof will be omitted. After the control portion 50 estimates the loosening amount upon conveyance exit S2 of the (n+1)th (2nd, at this point) page in S207, the control portion acquires the image information of the (n+1)th (2nd, at this point) page in S208. As described above, the control portion 50 acquires the print ratio from the acquired image information of the (n+1)th page and calculates the print ratio of the region where the transfer blurring occurs Rt. In S209, the control portion 50 determines whether or not there is an image in the region where the transfer blurring occurs Rt on the (n+1)th (2nd, at this point) page based on the calculated print ratio of the region where the transfer blurring occurs Rt. If the control portion 50 determines in S209 that there is an image in the region where the transfer blurring occurs Rt, the process then proceeds to S210, and if the control portion 50 determines that there is no image in the region where the transfer blurring occurs Rt, the process then proceeds to S212. In other words, if the control portion 50 determines that there is no image in the region where the transfer blurring occurs Rt, the control portion 50 does not execute the conveyance interval extension.

By the blurring suppressing control of the Embodiment 1 described above, even in a case in which the loosening amount upon conveyance exit S2 becomes large during the continuous printing on the thick papers, if there is no image in the region where the transfer blurring occurs, then the conveyance interval extension is not executed. Therefore, according to the blurring suppressing control of the Embodiment 1, it becomes possible to realize suppression of the transfer blurring while improving the productivity compared to the blurring suppressing control of the Comparative Example.

Effect of the Embodiment 1

Effect of the blurring suppressing control of the Embodiment 1 will be described using Tables 1 and 2. To verify the effect of the Embodiment 1, 10 different letter-sized images were printed continuously on one side, and evaluation for blurring suppressing effect and the productivity was performed. For the blurring suppressing effect, visual checks on the blurring on the printed image were performed. For the productivity, time to complete conveying the 10 sheets was measured. Evaluation environment was set as a normal temperature and humidity environment with temperature of 23° C. and humidity of 50%. A paper size is set as a letter size, basis weight is set to 163 g/m$^2$, and sheets are conveyed in the thick paper mode from the standby state.

For comparison, the Comparative Example 1 indicates the effect of the blurring suppressing control of the Comparative Example described above, and the Comparative Example 2 indicates the effect in normal print operation without executing the blurring suppressing control. Here, the threshold value for the loosening amount upon conveyance exit S2 in the blurring suppressing control of the Comparative Example 1 and the Embodiment 1 is set to 2.3 mm, and the conveyance interval extension time is set to 1.5 seconds. Incidentally, the conveyance interval extension time may be set in steps or continuously depending on the value of the loosening amount upon conveyance exit S2.

Table 1 is a table showing "determination results of the occurrence of the blurring in the Embodiment 1 and executed or not of the conveyance interval extension" on the images printed for confirming the effect. "Y" in fields of the "region where the transfer blurring occurs Rt" indicates that the print ratio of the region where the transfer blurring occurs Rt exceeded the threshold value in the determination in S209, and "N" indicates that the print ratio did not exceed the threshold value. In addition, "Y" in fields of the "loosening amount upon conveyance exit S2" indicates that the loosening amount upon conveyance exit S2 was the threshold value or more in the determination in S210, and "N" indicates that the loosening amount upon conveyance exit S2 was not the threshold value or more. In addition, "Y" in fields of the "executed or not of the conveyance interval extension" indicates that the conveyance interval extension (extension control) in S211 was executed, and "N" indicates that the conveyance interval extension was not executed. Incidentally, in the verification of the effect of the Embodiment 1, the fixing device 9 was not sufficiently warmed up to deeper portion of the pressing roller 9b in the continuous conveyance of 10 pages of the thick papers from the standby state even when the conveyance interval extension was executed.

Therefore, in the determination in S210, the loosening amount upon conveyance exit S2 was the threshold value or more on all pages. According to Table 1, in the blurring suppressing control of the Embodiment 1, as on a 5th page and a 10th page, the conveyance interval extension was executed only when the region where the transfer blurring occurs Rt is "Y" and the loosening amount upon conveyance exit S2 is "Y".

TABLE 1

Determination results of the occurrence of the blurring on the printed image and executed or not of the conveyance interval extension

| Image [page] | 2 | 3 | 4 | 5 | 6 | 7 | 8 | 9 | 10 |
|---|---|---|---|---|---|---|---|---|---|
| Region where the transfer blurring occurs Rt | N | N | N | Y | N | N | N | N | Y |
| Loosening amount upon conveyance exit S2 | Y | Y | Y | Y | Y | Y | Y | Y | Y |
| Executed or not of the conveyance interval extension | N | N | N | Y | N | N | N | N | Y |

Table 2 shows the verification results of the blurring suppressing effect and the productivity of the Embodiment 1, the Comparative Example 1 and Comparative Example 2. Based on the results of presence or absence of the occurrence of the blurring in Table 2, it can be found that the Embodiment 1 and the Comparative Example 1 can suppress the occurrence of the blurring compared to the Comparative Example 2, which is the normal print operation without executing the blurring suppressing control. In addition, based on the results of the productivity, it can be found that the Embodiment 1 can complete printing of the 10 images in 36.0 seconds, compared to 46.5 seconds in the Comparative Example 1. Improvement of the productivity is also confirmed by a fact that the control of the Embodiment 1 can shorten the continuous print operation on one side of 10 pages of the thick papers by 10.5 seconds compared to the Comparative Example 1.

TABLE 2

Verification results of the blurring suppressing effect and the productivity

| | Presence or absence of the occurrence of the blurring | Productivity [s] |
|---|---|---|
| Embodiment 1 | N | 36 |
| Comparative Example 1 | N | 46.5 |
| Comparative Example 2 | Y | 33 |

As described above, according to the Embodiment 1, it becomes possible to suppress the occurrence of the blurring while improving the productivity in the blurring suppressing control using the image information of a predetermined region. As described above, according to the Embodiment 1, it becomes possible to suppress the occurrence of the image defect while improving the productivity.

Embodiment 2

An Embodiment 2 will be described below. Since the basic configuration and operation of an image forming apparatus 200 of the Embodiment 2 are the same as in the Embodiment 1, the description thereof will be omitted and only characteristic parts will be described.

(Characteristics of the Image Forming Apparatus of the Embodiment 2)

Figure 8:
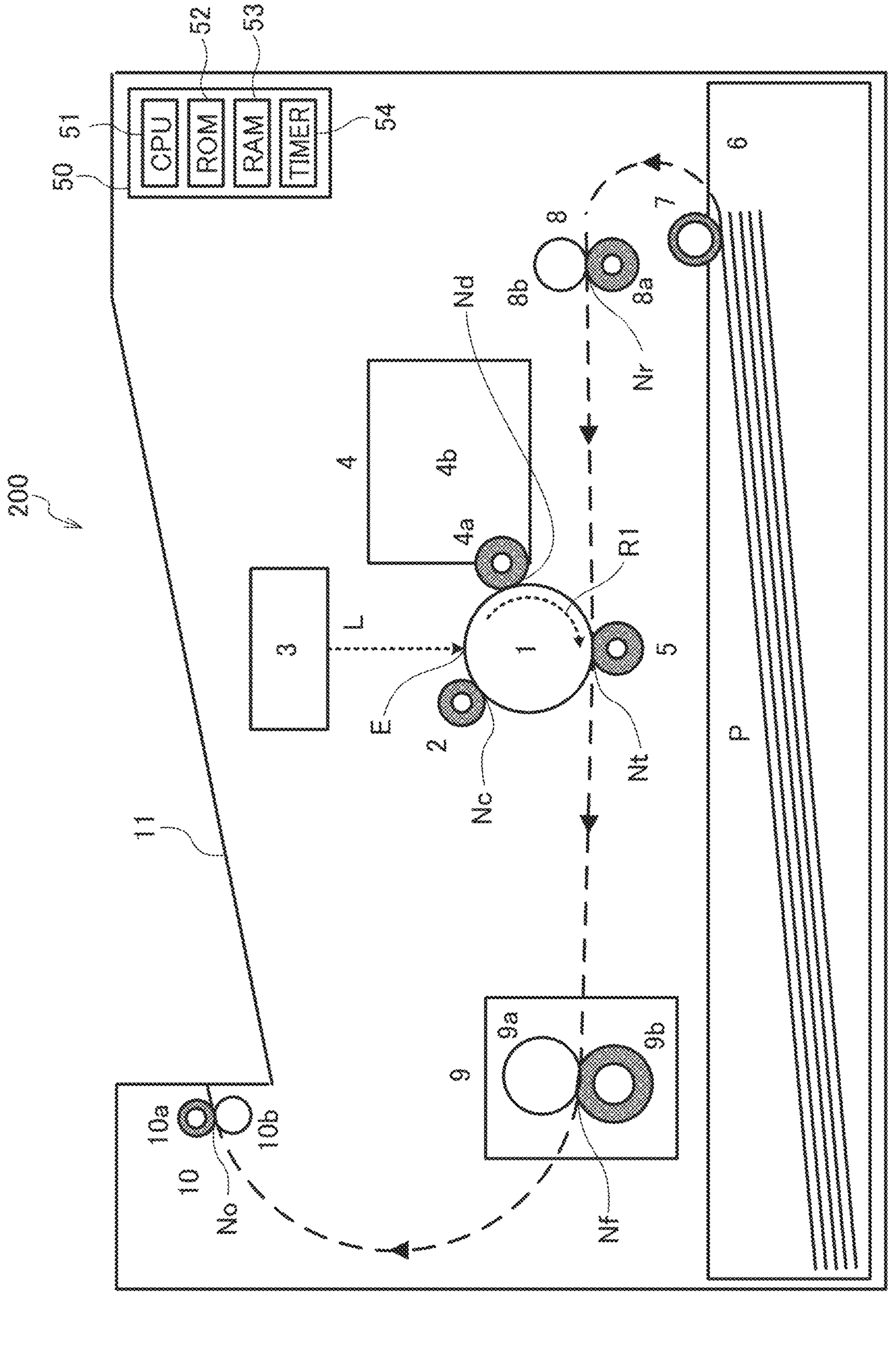
FIG. 8 is a schematic cross-sectional view of an image forming apparatus of the Embodiment 2.

FIG. 8 is a schematic cross-sectional view of the image forming apparatus 200 used in the Embodiment 2. The image forming apparatus 200 in the Embodiment 2 has a drum-cleaner-less configuration, which does not include the drum cleaning device around the photosensitive drum 1. The drum cleaning device generally brings the photosensitive drum 1 and a cleaning member in contact with each other to collect the toner remaining on the surface of the photosensitive drum 1 by frictional force. Therefore, in the Embodiment 2, it is configured to be more prone to the speed fluctuation than in the Embodiment 1 due to loss of the frictional force of the cleaning member. Since the other configurations are the same as the image forming apparatus 100 shown in FIG. 1, the same reference numerals are used and the description thereof will be omitted.

(Blurring Suppressing Control of the Embodiment 2)

The blurring suppressing control of the Embodiment 2 will be described using FIG. 9. As described above, the configuration of the image forming apparatus 200 of the Embodiment 2 is the drum-cleaner-less configuration, and there is the possibility that the four types of the blurring of the transfer blurring, the developing blurring, the latent image blurring and the charging blurring occur. Therefore, the blurring suppressing control of the Embodiment 2 is intended to suppress these four types of the blurring.

In the Embodiment 2, the control portion 50 acquires, as the image information, all image types (the solid black image, the halftone, the text and the white solid image) and the print ratio of each image type for each region sectioned by the predetermined lengths in the main scanning direction and sub scanning direction. The control portion 50 then calculates the print ratio for the region where the transfer blurring occurs Rt, a region where the developing blurring occurs Rd, a region where the latent image blurring occurs Re, and a region where the charging blurring occurs Rc. Then, as the determination for the conveyance interval extension, it is configured that if the print ratio described above exceeds 0% (when there is the toner image), the control portion 50 executes the conveyance interval extension. Incidentally, regarding the image types, it may be configured that only the print ratio of the halftone or the text, in which the blurring is easily visible, is acquired and used for the determination whether or not the image is present in the region where the blurring occurs. In addition, the threshold value may be set individually depending on visibility and likelihood of the occurrence of each blurring.

Figure 9:
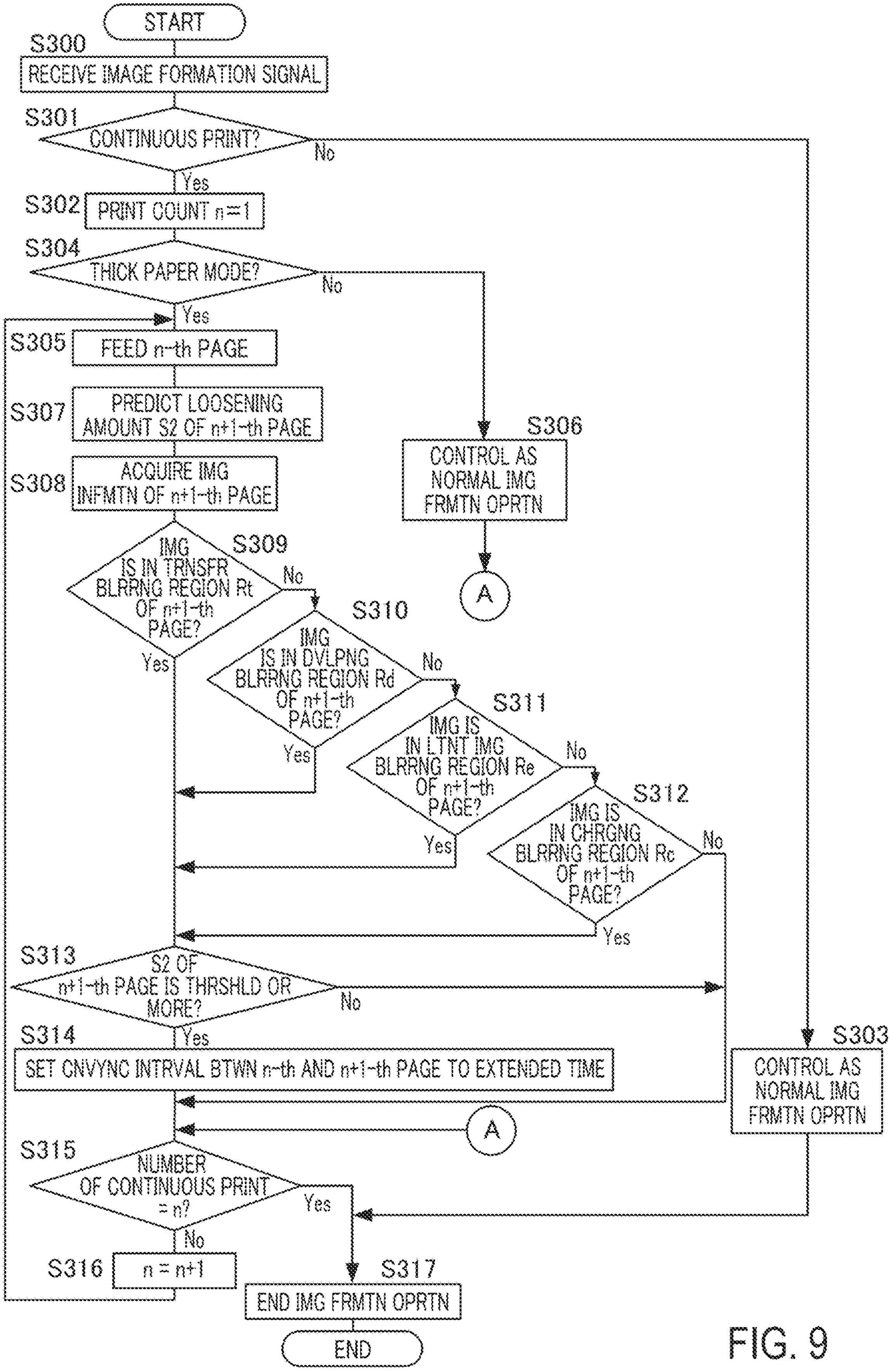
FIG. 9 is a flow chart illustrating blurring suppressing control of the Embodiment 2.

FIG. 9 is a schematic flow chart of the blurring suppressing control of the Embodiment 2. Incidentally, since processes of S300 through S309 and S313 through S317 are the same as those of S200 through S214 in FIG. 7 of the Embodiment 1, the description thereof will be omitted. If the control portion 50 determines in S309 that there is no image in the region where the transfer blurring occurs Rt of the (n+1)th (2nd, at this point) page, the process then proceeds to S310. In S310, the control portion 50 determines whether or not there is an image in the region where the developing blurring occurs Rd of the (n+1)th (2nd, at this point) page. If the control portion 50 determines in S310 that there is an image in the region where the developing blurring occurs Rd of the (n+1)th page, the process then proceeds to S313, and if the control portion 50 determines that there is no image in the region where the developing blurring occurs Rd, the process then proceeds to S311.

In S311, the control portion 50 determines whether or not there is an image in the region where the latent image blurring occurs Re of (n+1)th (2nd, at this point) page. If the control portion 50 determines in S311 that there is an image in the region where the latent image blurring occurs Re of (n+1)th page, the process then proceeds to S313, and if the control portion 50 determines that there is no image in the region where the latent image blurring occurs Re, the process then proceeds to S312. In S312, the control portion 50 determines whether or not there is an image in the region where the charging blurring occurs Rc of the (n+1)th (2nd, at this point) page.

If the control portion 50 determines in S312 that there is an image in the region where the charging blurring occurs Rc of the (n+1)th page the process then proceeds to S313, and if the control portion 50 determines that there is no image in the region where the charging blurring occurs Rc, the process then proceeds to S315. As such, if a determination result of at least one of S309 through S312 is Yes, then the control portion 50 determines in S313 whether or not the loosening amount upon conveyance exit S2 of the (n+1)th (2nd, at this point) page is the threshold value or more.

By the blurring suppressing control of the Embodiment 2 described above, even in the case in which the loosening amount upon conveyance exit S2 becomes large during the continuous printing on the thick papers, if there is no image in any of the four types of the region where the blurring occurs, then the conveyance interval extension is not executed. Therefore, even with the image forming apparatus 200 of the drum-cleaner-less method as in the Embodiment 2, it becomes possible to suppress the blurring while improving the productivity compared to conventional methods.

Effect of the Embodiment 2

Effect of the blurring suppressing control of the Embodiment 2 will be described using Tables 3 and 4. To verify the effect of the Embodiment 2, 10 different letter-sized images were printed continuously on one side and evaluation for blurring suppressing effect and the productivity was performed. For the blurring suppressing effect, visual checks on the blurring on the printed image were performed. For the productivity, time to complete conveying the 10 sheets was measured. Evaluation environment was set as a normal temperature and humidity environment with temperature of 23° C. and humidity of 50%. A paper size is set as a letter size, basis weight is set to 163 g/m$^2$, and sheets are conveyed in the thick paper mode from the standby state.

For comparison, the Comparative example 1 indicates the effect of the blurring suppressing control of the Comparative Example described above, and the Comparative Example 2 indicates the effect in the normal print operation without executing the blurring suppressing control. Here, the threshold value for the loosening amount upon conveyance exit S2 in the blurring suppressing control of the Comparative Example 1 and the blurring suppressing control of the Embodiment 2 is set to 2.3 mm, and the conveyance interval extension time is set to 1.5 seconds. Incidentally, the conveyance interval extension time may be set in steps or continuously depending on the value of the loosening amount upon conveyance exit S2.

Table 3 is a table showing "determination results of the occurrence of the blurring in the Embodiment 2 and executed or not of the conveyance interval extension" on the images printed for confirming the effect. "Y" in fields of the "region where the transfer blurring occurs Rt" indicates that the print ratio of the region where the transfer blurring occurs Rt exceeded the threshold value in the determination in S309, and "N" indicates that the print ratio did not exceed the threshold value. The same applies to fields of the "region where the developing blurring occurs Rd" (determination result in S310), the "region where the latent image blurring occurs Re" (determination result in S311), and the "region where the charging blurring occurs Rc" (determination result in S312) as the fields of the "region where the transfer blurring occurs Rt". In addition, "Y" in the fields of the "loosening amount upon conveyance exit S2" indicates that the loosening amount upon conveyance exit S2 was the threshold value or more in the determination in S313, and "N" indicates that the loosening amount upon conveyance exit S2 was not the threshold value or more. In addition, "Y" in the fields of the "executed or not of the conveyance interval extension" indicates that the conveyance interval extension in step S314 was executed, and "N" indicates that the conveyance interval extension was not executed. Incidentally, in the verification of the effect of the Embodiment 2, the fixing device 9 was not sufficiently warmed up to the deeper portion of the pressing roller 9*b* in the continuous conveyance of 10 pages of the thick papers from the standby state even when the conveyance interval extension was executed. Therefore, in the determination in S313, the loosening amount upon conveyance exit S2 was the threshold value or more on all pages.

TABLE 3

Determination results of the occurrence of the blurring on the printed image and executed or not of the conveyance interval extension

| Image [page] | 2 | 3 | 4 | 5 | 6 | 7 | 8 | 9 | 10 |
|---|---|---|---|---|---|---|---|---|---|
| Region where the transfer blurring occurs Rt | N | N | N | Y | N | N | N | N | Y |
| Region where the developing blurring occurs Rd | N | N | N | Y | N | Y | N | N | N |
| Region where the latent image blurring occurs Re | N | Y | N | Y | N | N | Y | N | N |
| Region where the charging blurring occurs Rc | N | Y | N | Y | N | N | N | Y | N |
| Loosening amount upon conveyance exit S2 | Y | Y | Y | Y | Y | Y | Y | Y | Y |
| Executed or not of the conveyance interval extension | N | Y | N | Y | N | Y | Y | Y | Y |

In Table 3, on 2nd page, 4th page and 6th page, although the loosening amount upon conveyance exit S2 was the threshold value or more, since the blurring was not the threshold value or more in any of the occurrence regions, the conveyance interval extension was not executed. Incidentally, on the other pages, since the blurring was the threshold value or more in at least one occurrence region and the loosening amount upon conveyance exit S2 was also the threshold value or more, the conveyance interval extension was executed.

Table 4 shows the verification results of the blurring suppressing effect and the productivity of the Embodiment 2, the Comparative Example 1 and Comparative Example 2. Based on the results of presence or absence of the occurrence of the blurring in Table 4, it can be found that the Embodiment 2 and the Comparative Example 1 can suppress the occurrence of the blurring compared to the Comparative Example 2, which is the normal print operation without executing the blurring suppressing control. In addition, based on the results of the productivity, the improvement of the productivity is also confirmed by a fact that printing of the 10 images can be completed in 42.0 seconds in the Embodiment 2, compared to 46.5 seconds in the Comparative Example 1, and therefore the continuous print operation on one side of 10 pages of the thick papers can be shortened by 4.5 seconds compared to the Comparative Example 1.

Incidentally, the 10 pages of the images printed in the effectiveness verification of the Embodiment 2 are the same as the 10 pages of the images printed in the effectiveness verification of the Embodiment 1. In the Embodiment 2, however, not only the transfer blurring, but also the developing blurring, the latent image blurring and the charging blurring are targeted for the blurring suppression. Thus, in the Embodiment 2, a number of pages for which the conveyance interval is extended is increased, and therefore, the effect of the improvement of the productivity becomes less than that in the case of the Embodiment 1 in which the blurring suppression is applied to the image forming apparatus 100 provided with the drum cleaning device 12.

TABLE 4

Verification results of the blurring suppressing effect and the productivity

| | Presence or absence of the occurrence of the blurring | Productivity [s] |
|---|---|---|
| Embodiment 2 | N | 42 |
| Comparative Example 1 | N | 46.5 |
| Comparative Example 2 | Y | 33 |

As described above, according to the Embodiment 2, it becomes possible to suppress the occurrence of the blurring with the blurring suppressing control using the image information of the predetermined regions, while improving the productivity compared to the conventional methods. As described above, according to the Embodiment 2, it becomes possible to suppress the occurrence of the image defect while improving the productivity.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-067004 filed on Apr. 17, 2023, which is hereby incorporated by reference herein in its entirety.

What is claimed is:

1. An image forming apparatus comprising:

an image bearing member;

a conveyance unit including a pair of rotatable members and configured to convey a recording material by a conveyance nip portion formed by the pair of rotatable members;

a transfer unit forming a transfer nip portion with the image bearing member and configured to transfer a toner image onto the recording material, conveyed by the conveyance unit, in the transfer nip portion;

a fixing unit including a rotatable heating member and a rotatable pressing member forming a fixing nip portion with the rotatable heating member and configured to fix the toner image transferred to the recording material by the transfer unit in the fixing nip portion; and a control unit configured to control conveyance of the recording material, wherein in a case of performing a continuous print in which a first recording material and a second recording material following the first recording material are conveyed and image formation is executed thereon, the control unit executes following operations of:

acquiring information on an image to be formed on the second recording material and a length of the second recording material in a conveyance direction;

calculating, based on the acquired length of the second recording material in the conveyance direction before feeding the second recording material, a loosening amount which is an amount of loosening of the second recording material between the conveyance nip portion and the transfer nip portion in a case in which the second recording material is nipped in the conveyance nip portion and the transfer nip portion;

determining, based on the acquired information on the image, whether an image exists in a region where an image defect would be generated in the image to be transferred to the second recording material due to an impact that occurrs when a trailing end of the second recording material with respect to the conveyance direction passes through the conveyance nip portion; and performing extension control in which a conveyance interval between the first recording material and the second recording material is extended in a case in which it is determined that the loosening amount is a predetermined value or more and the image exists in the region.

2. An image forming apparatus according to claim 1, wherein the loosening amount is a difference between a length of the second recording material from a downstream end of the conveyance nip portion to an upstream end of the transfer nip portion and a length of a straight line from the downstream end of the conveyance nip portion to the upstream end of the transfer nip portion in the conveyance direction.

3. An image forming apparatus according to claim 2, wherein the control unit calculates the loosening amount based on the length of the second recording material in the conveyance direction, a conveyance speed in the conveyance nip portion, a conveyance speed in the transfer nip portion and a time from entering of a leading end of the second recording material into the fixing nip portion until passing of the trailing end of the second recording material through the conveyance nip portion.

4. An image forming apparatus according to claim 3, wherein the control unit sets the conveyance speed in the fixing nip portion to the conveyance speed in the transfer nip portion, and wherein the conveyance speed in the fixing nip portion changes in response to an outer diameter of the rotatable pressing member which changes depending on temperature change.

5. An image forming apparatus according to claim 1, wherein the control unit calculates a print ratio in the region based on the information on the image, and determines whether the image exists or not in the region based on the calculated print ratio.

6. An image forming apparatus according to claim 5, wherein the information on the image is an image type including a black solid image, a halftone, a text and a white solid image and a print ratio of each image type.

7. An image forming apparatus according to claim 1, wherein a basis weight of the first recording material and the second recording material is 90 $g/m^2$ or more.

8. An image forming apparatus according to claim 1, further comprising:

a cleaning unit configured to collect toner which is not to be transferred to the recording material in the transfer nip portion and remains on the image bearing member;

a charging unit configured to charge the image bearing member at a predetermined potential;

an exposing unit configured to emit a laser light to the image bearing member and form an electrostatic latent image; and a developing unit configured to develop the electrostatic latent image with toner, wherein the region is included in the transfer nip portion.

9. An image forming apparatus according to claim 1, further comprising:

a charging unit configured to charge the image bearing member at a predetermined potential;

an exposing unit configured to emit a laser light to the image bearing member and form an electrostatic latent image; and a developing unit configured to develop the electrostatic latent image with toner, wherein the region is included in each of a region where the charging unit charges the image bearing member, a region where the exposing unit exposes the image bearing member, a region where the developing unit develops the image bearing member and the transfer nip portion.

* * * * *